US011408453B2

(12) United States Patent
Binkert et al.

(10) Patent No.: US 11,408,453 B2
(45) Date of Patent: Aug. 9, 2022

(54) CLAMPING ELEMENT, METHOD FOR ASSEMBLING A CLAMPING ELEMENT, METHOD FOR CLAMPING A CLAMPING ELEMENT AND SYSTEM OF AN ELEMENT AND A CLAMPING ELEMENT

(71) Applicant: A. RAYMOND ET CIE, Grenoble (FR)

(72) Inventors: Sven Binkert, Lörrach (DE); David Lamoureux, Grenoble (FR)

(73) Assignee: A. RAYMOND ET CIE, Grenoble (FR)

( * ) Notice: Subject to any disclaimer, the term of this patent is extended or adjusted under 35 U.S.C. 154(b) by 106 days.

(21) Appl. No.: 16/697,932

(22) Filed: Nov. 27, 2019

(65) Prior Publication Data

US 2020/0173470 A1  Jun. 4, 2020

(30) Foreign Application Priority Data

Nov. 30, 2018 (EP) ..................................... 18209543

(51) Int. Cl.
*B60R 13/02* (2006.01)
*F16B 2/22* (2006.01)
(Continued)

(52) U.S. Cl.
CPC ............ *F16B 2/22* (2013.01); *B60R 13/0206* (2013.01); *F16B 5/0635* (2013.01); *F16B 5/123* (2013.01); *F16B 21/075* (2013.01)

(58) Field of Classification Search
CPC .......... F16B 2/22; F16B 5/0635; F16B 5/123; F16B 21/075; B60R 13/0206
See application file for complete search history.

(56) References Cited

U.S. PATENT DOCUMENTS 5,028,187 A * 7/1991 Sato ..................... F16B 19/1081
                                                              411/48
5,509,182 A * 4/1996 Nakanishi ............... F16B 5/065
                                                              24/289
(Continued)

FOREIGN PATENT DOCUMENTS

DE      102011016647 A1    10/2012
FR           2690487 A1    10/1993

OTHER PUBLICATIONS

Machine assisted English translation of FR2690487A1 obtained from https://patents.google.com on Nov. 26, 2019, 5 pages.
(Continued)

*Primary Examiner* — Jason W San
(74) *Attorney, Agent, or Firm* — Warner Norcross + Judd LLP

(57) ABSTRACT

Disclosed is a clamping element to clamp to a portion of an element. The clamping element has a housing with a receiving space, the housing having an opening that connects the outside of the housing with the receiving space, a clip arranged inside the housing, the clip having a first leg and a second leg arranged opposite each other, a bridge connecting the first leg and the second leg, the receiving space at least partially being arranged between the first leg and the second leg, wherein a force needs to be applied to move the first leg away from the second leg and in a pre-assembly state of the clip, which describes the position that the elements of the clip have prior to the portion of the element that is to be clamped having been introduced into the receiving space.

13 Claims, 9 Drawing Sheets

(51) Int. Cl.
*F16B 5/06* (2006.01)
*F16B 5/12* (2006.01)
*F16B 21/07* (2006.01)

(56) References Cited

U.S. PATENT DOCUMENTS

| | | | | |
|---|---|---|---|---|
| 6,474,616 | B2* | 11/2002 | Yamada | F16B 21/075 248/503.1 |
| 7,874,048 | B2* | 1/2011 | Katoh | F16B 5/065 24/297 |
| 7,878,749 | B2* | 2/2011 | Edland | F16B 21/086 411/508 |
| 8,046,880 | B2* | 11/2011 | Katoh | F16B 5/0628 24/458 |
| 8,567,744 | B1* | 10/2013 | Marn | F16M 11/041 248/548 |
| 8,936,420 | B2* | 1/2015 | Scroggie | F16B 5/065 411/45 |
| 9,649,993 | B1* | 5/2017 | Dickinson | F16B 5/0657 |
| 10,408,248 | B1* | 9/2019 | Safry | F16B 5/0628 |
| 10,670,059 | B2* | 6/2020 | Jackson, Jr. | F16B 5/0642 |
| 2001/0022923 | A1* | 9/2001 | Arisaka | F16B 19/1081 411/45 |
| 2002/0194710 | A1* | 12/2002 | Dickinson | F16B 21/075 24/295 |
| 2005/0105987 | A1* | 5/2005 | Giugliano | F16B 5/0657 411/508 |
| 2005/0217082 | A1* | 10/2005 | Vassiliou | F16B 5/0614 24/294 |
| 2005/0236861 | A1* | 10/2005 | Slobodecki | F16B 37/043 296/39.1 |
| 2006/0168773 | A1* | 8/2006 | Smith | F16B 21/075 24/295 |
| 2006/0242802 | A1* | 11/2006 | Scroggie | F16B 5/0657 24/297 |
| 2006/0254032 | A1* | 11/2006 | Gibbons | B60R 13/0206 24/295 |
| 2009/0285648 | A1* | 11/2009 | Gosis | B25B 31/00 411/22 |
| 2009/0293237 | A1* | 12/2009 | Benedetti | F16B 21/086 24/289 |
| 2011/0041293 | A1* | 2/2011 | Langediers | F16B 5/123 24/291 |
| 2012/0131771 | A1* | 5/2012 | Hofmann | F16B 5/065 24/595.1 |
| 2012/0272487 | A1* | 11/2012 | Cooley | F16B 5/0657 24/289 |
| 2013/0340216 | A1* | 12/2013 | Smith | F16B 2/22 24/564 |
| 2014/0157641 | A1* | 6/2014 | Tucker | F16B 2/22 42/94 |
| 2015/0211565 | A1* | 7/2015 | Benedetti | B60R 13/0206 24/292 |
| 2016/0101756 | A1* | 4/2016 | Benedetti | F16B 5/0657 24/464 |
| 2016/0121836 | A1* | 5/2016 | Yamamoto | B60R 21/213 280/728.2 |
| 2016/0195118 | A1* | 7/2016 | Munch-Fals | F16B 2/245 24/535 |
| 2016/0214548 | A1* | 7/2016 | Moller | B29B 11/06 |
| 2016/0280172 | A1* | 9/2016 | Yamamoto | F16B 19/1081 |
| 2016/0375840 | A1* | 12/2016 | Dickinson | B60R 13/02 24/295 |
| 2017/0114809 | A1 | 4/2017 | Stickelberger et al. | |
| 2017/0240121 | A1* | 8/2017 | Yon | B60R 13/0206 |
| 2017/0305363 | A1* | 10/2017 | Jadhav | B60R 13/0243 |
| 2017/0305364 | A1* | 10/2017 | Jadhav | B60R 13/0206 |
| 2018/0100531 | A1* | 4/2018 | Flynn | F16B 21/07 |
| 2018/0251013 | A1 | 9/2018 | Ibrahim et al. | |
| 2019/0040886 | A1* | 2/2019 | Porter | F16B 2/22 |
| 2019/0084499 | A1* | 3/2019 | Pinon Perez | F16B 5/06 |

OTHER PUBLICATIONS

Machine assisted English translation of DE102011016647A1 obtained from https://patents.google.com on Nov. 26, 2019, 8 pages.

\* cited by examiner

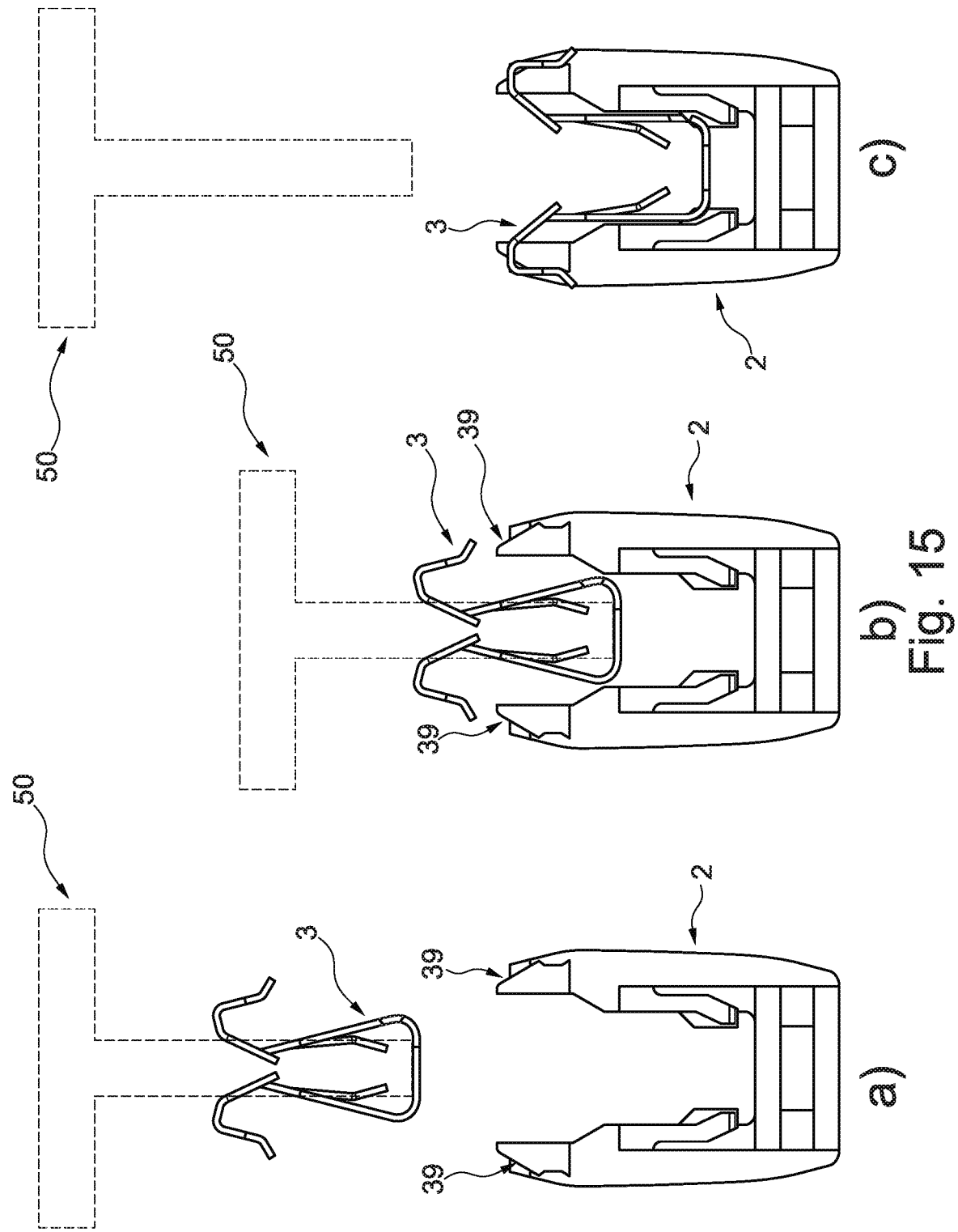

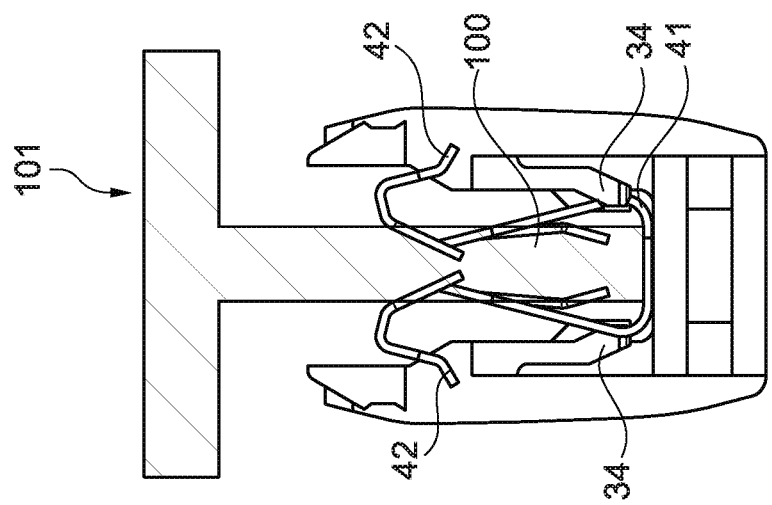
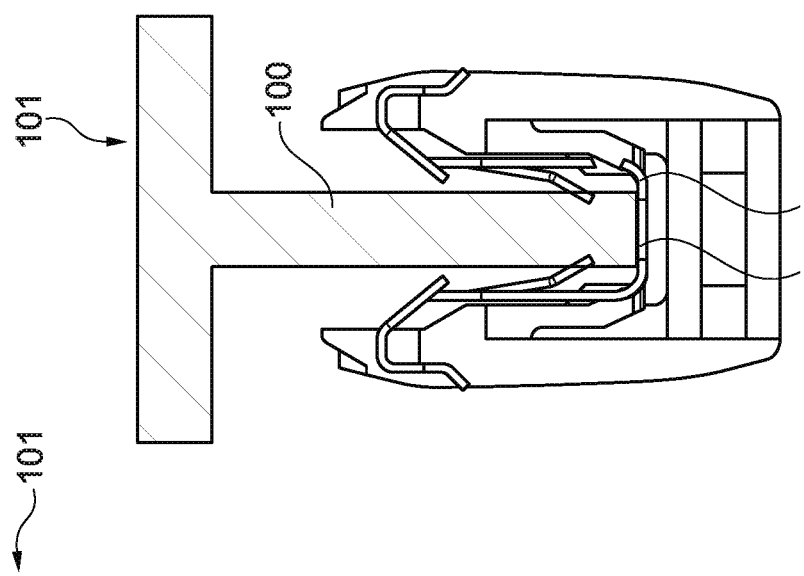
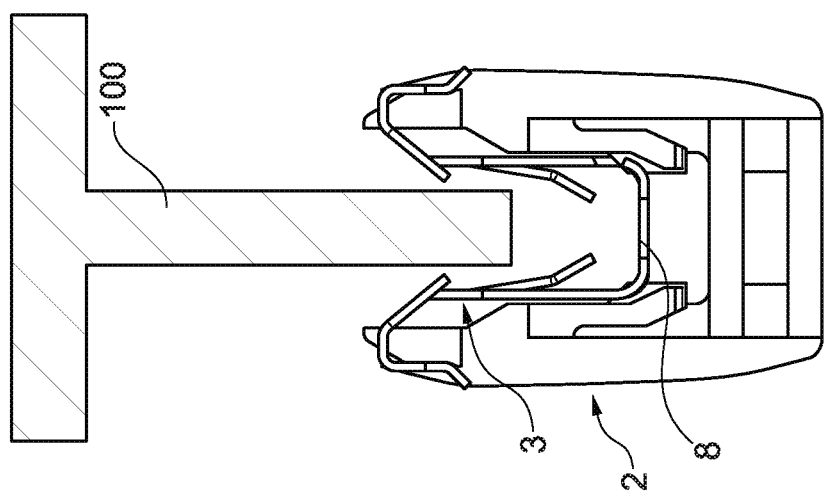

CLAMPING ELEMENT, METHOD FOR ASSEMBLING A CLAMPING ELEMENT, METHOD FOR CLAMPING A CLAMPING ELEMENT AND SYSTEM OF AN ELEMENT AND A CLAMPING ELEMENT

CROSS-REFERENCE TO RELATED APPLICATIONS

This application claims priority to and all advantages of European Patent Application No. 18209543.0, filed on 30 Nov. 2018, the contents of which are hereby incorporated by reference.

FIELD OF THE INVENTION

The invention relates to a clamping element, a method for assembling a clamping element, a method for clamping a clamping element and a system of an element and a clamping element.

BACKGROUND OF THE INVENTION

Clip fasteners replace traditional screw fixings in many applications and have many uses in a wide variety of industries. Clip fasteners commonly find use in the energy and automotive sectors.

Modern demands on the design and construction of fasteners mean that also new clamping element solutions need to contribute to ease of assembly as used in production (particularly in view of increasing automation) and/or provide excellent attachment strength, while maintaining high reliability and low production costs. Compliance with the need for standardization and the requirements of the automotive industry has proven challenging to clamping element designs.

It is an object of the present invention to provide a clamping element which is improved with regard to at least one of the aforementioned issues and/or advantages. Further, it is an object of the present invention to improve a method for assembling a clamping element. In addition, it is an object of the present invention to improve a method for clamping a clamping element. Moreover, it is an object of the present invention to provide an improved system of an element and a clamping element.

BRIEF SUMMARY OF THE INVENTION

Disclosed is a clamping element suitable to clamp to a portion of an element, the clamping element having:

a housing with a receiving space, the housing having an opening that connects the outside of the housing with the receiving space, and a clip arranged inside the housing, the clip having a first leg and a second leg arranged opposite each other, a bridge connecting the first leg and the second leg, the receiving space at least partially being arranged between the first leg and the second leg, wherein the claiming element is configured such that a force needs to be applied to move the first leg away from the second leg in a pre-assembly state of the clip, which is the position that the elements of the clip have prior to the portion of the element that is to be clamped having been introduced into the receiving space, wherein the first leg with regard to its relative position relative to the second leg is held in a first position by being connected to a first part of the housing, the connection of the first leg with the first part of the housing being provided by a holding protrusion of the first leg being arranged behind a holding ledge of the first part of the housing, the contact between the holding protrusion of the first leg and the holding ledge being lost, if the first leg is moved in a sliding manner within the housing and/or the first leg being connected to the first part of housing by a breakable connection that can be broken by applying a shearing force to it, the second leg being connected to a second part of the housing, the connection of the second leg with the second part of the housing being provided by a holding protrusion of the second leg being arranged behind a holding ledge of the second part of the housing and/or the second leg being connected to the second part of the housing by a breakable connection that can be broken by applying a shearing force to it, whereby in the first position of the first leg, the first leg is spaced apart from second leg to such an extent that the clip is in a tensioned state creating a restoring force onto the first leg that is directed to moving the first leg towards a second position of the first leg that is closer towards the second leg than the first position.

BRIEF DESCRIPTION OF THE DRAWINGS

The invention is described in greater detail below with reference to the accompanying Figures, in which:

FIG. 15 shows side views of the housing and the clip during the method for assembling the clamping element according to FIG. 12; and FIGS. 16a-16c show side views of the clamping element according to FIG. 12 during a method for clamping the clamping element.

DETAILED DESCRIPTION

Figure 1:
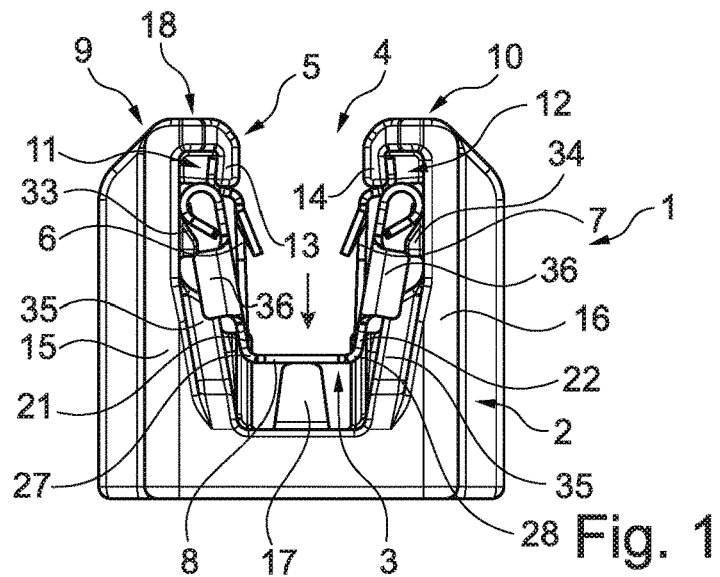
FIG. 1 shows a clamping element in a pre-assembly state of a clip according to a first embodiment seen from the side.

The invention involves a clip arranged inside a housing, wherein the clip comprises two legs and a force needs to be applied to move one of the legs away from the other leg. The clip itself comprises an inherent force to clamp to a portion of an element which is arranged between the two legs. The invention has recognized that in a pre-assembly state of the clip—prior to clamping—, the housing can be used to create a restoring force onto at least one of the legs that is directed to moving this leg towards a position of this leg that is closer towards the other leg in a further position. The invention has recognized that despite the fact that the two legs tend to move towards each other because of the inherent force, the clip can be arranged inside a housing such that the distance between the two legs is greater than the distance between the two legs without applying a force. Although the clip is arranged inside the housing, an element which is to be clamped by the clamping element can be inserted between the two legs.

The invention provides a clamping element suitable to clamp to a portion of an element. The clamping element having a housing and a clip. The housing having a receiving space and an opening that connects the outside of the housing with the receiving space. The clip arranged inside the housing and having a first leg and a second leg arranged opposite each other. A bridge connects the first leg and the second leg. The receiving space is at least partially arranged between the first leg and the second leg. A force needs to be applied to move the first leg away from the second leg. In a pre-assembly state of the clip, which describes the position that the elements of the clip have prior to the portion of the element, which is to be clamped by the clamping element, having been introduced into the receiving space. The first leg with regard to its relative position relative to the second leg is held in a first position by being connected to a first part of the housing, the connection of the first leg with the first part of the housing being provided by a holding protrusion of the first leg being arranged behind a holding ledge of the first part of the housing, the contact between the holding protrusion of the first leg and the holding ledge being lost, if the first leg is moved in a sliding manner within the housing and/or the first leg being connected to the first part of the housing by a breakable connection that can be broken by applying a shearing force to it, the second leg being connected to a second part of the housing, the connection of the second leg with the second part of the housing being provided by a holding protrusion of the second leg being arranged behind a holding ledge of the second part of the housing and/or the second leg being connected to the second part of the housing by a breakable connection that can be broken by applying a shearing force to it. In the first position of the first leg, the first leg is spaced apart from the second leg to such an extent that the clip is in a tension state creating a restoring force onto the first leg that is directed to moving the first leg towards a second position of the first leg that is closer towards the second leg and the first position.

The "portion of an element" according to the description can be every portion of a component especially every portion of a component having a thickness which is bigger than the distance between the two legs of the clip without applying a force to move the two legs away from each other. Especially, the element can be a panel(-like), rim(-like) or rib(-like) component, typically a rib tower. The clamping element can itself be attached or connected to a cable strap.

The "housing" can be any component being of a solid or rigid material, especially metal or plastic, for forming elements mentioned in the description, especially a receiving space for the clip. The housing doesn't necessarily have to have closed side walls. Any component having an outer contour in which a receiving space can be defined is possible.

Typically, the force which is needed to be applied to move the first leg away from the second leg, is a mechanical force which can be applied by a component having a respective thickness and or dimension and being arranged with regard to the two legs. An assembly slider component can apply a mechanical force to the first and/or the second leg by moving between the two legs. In addition or as an alternative the housing can have a means which interacts with the clip during assembling the pre-assembly state which can move the first leg away from the second leg.

Typically, the movement of the first leg and the second leg with regard to each other, can have an elastic feature with regard to the two legs, so that the movement is substantially reversible, which is desirable. In addition or alternatively, the movement of the two legs with regard to each other can have to a certain amount a plastic deformation being substantially irreversible.

According to the description, the term "leg" encompasses a component comprising at least a section which at least partially faces the opening and/or an element inserted into the opening and capable of being brought into contact with the portion of the element. The two legs can be moved with regard to each other so that a) one of the two legs moves with regard to the other, without movement of the other leg or b) each of the two legs moves with regard to the other leg, wherein the distance of the movement can be substantially equal with regard to each other or different. Especially, the two legs can extend from the bridge from opposing sides. In certain embodiments, the legs and the bridge can be formed in one piece. Especially, the first and the second legs can be substantially arranged mirror-like. Especially, the two legs can be substantially symmetrically arranged with regard to the bridge. In a specific embodiment the legs are attached or extend from the bridge at opposing sides which extend along the longitudinal axis of the bridge.

The first and/or second leg can have one or more, especially two, connecting sections with the bridge which—in case of two or more connection sections—can be separate to each other. The first and/or second leg may at least partially surround a window. A window may obtain the possibility to provide a stable connection by reducing the material and/or weight. Further, the window can be used as a guiding element, especially in interaction with an element of the housing extending into the receiving space of the housing and into the window. The window may be formed or surrounded by a part of the bridge, the sections of the leg extending from the connecting sections and a section of the leg being spaced apart from the bridge and connecting the two sections of the leg extending from the bridge.

According to the description, the term "pre-assembly state" of the clip encompasses a state in which the clamping element is ready to use, i.e. in a state prior to clamping, and can be sold. In the pre-assembly state of the clip, a portion of an element can be inserted into the opening and be clamped to the clamping element. When it is described that the portion of the element is inserted into the opening into the receiving space this encompasses that the clamping element is moved relative to the portion of the element with or without additional movement of the portion of the element.

When it is described that the first leg is spaced apart from the second leg to such an extent that the clip is in a tensioned state creating a restoring force onto the first leg that is directed to moving the first leg towards a second position of the first leg that is closer towards the second leg and the first position, it is described that the clip in the housing in the pre-assembly state is in a tensioned state ready for clamping the element to be clamped by releasing the tensioned state which in turn means that the connection of the first and/or the second leg with the first part and the second part of the housing, respectively, is disengaged and/or broken.

It is described that the first leg with regard to its relative position relative to the second leg is held in a first position by being connected to a first part of the housing. The connection of the first leg with the first part of the housing can be provided by several, at least three, alternatives. A first alternative can be that the connection is provided by a holding protrusion of the first leg being arranged behind a holding ledge of the first part of the housing. The contact between the holding protrusion of the first leg and the holding ledge is lost in the first alternative, if the first leg is moved in a sliding manner within the housing. Therefore, the sliding movement disengages the holding protrusion of the leg and the holding ledge of the housing. In a second alternative, the connection of the first leg with the first part of the housing can be provided by a breakable connection that can be broken by applying a shearing force to it. The connection of the first leg with the first part of the housing can be formed by any non-releaseable connection, i.e. a substance-locking connection, in which the first leg and the first part of the housing are held together by atomic and molecular forces. The breakable connection can be formed by glueing, solding, welding and/or vulcanizing. Especially, the shearing force can be applied by a force directed in a direction of the movement of the portion of the element being inserted. A third alternative can be a combination of the aforementioned alternatives.

The alternative that the connection is provided by at least one holding protrusion of the first leg being arranged behind a holding ledge of the first part of the housing encompasses the possibility that an end of the first leg opposite to the bridge can extend in a direction substantially towards the opening or in a direction substantially away from the opening. The holding protrusion can comprise a stop surface, having a normal which includes with the force which is needed to be applied to move the first leg away from the second leg an angle between 0° and 80°, alternatively an angle between 0° and 40°. The contact of the holding protrusion and the holding ledge can be lost by initiating the sliding movement of the clip, especially in case that the stop surface ends with regard to the direction of the movement of the clip so that the holding protrusion and the holding ledge become disengaged.

The sliding movement of the first leg can be initiated by the portion of the element which is to be clamped when the portion of the element is introduced in the opening of the housing and abutting a part of the clip. Especially, the direction of movement of the first leg is substantially in the direction of the movement of the portion of the element. Typically, the sliding movement can be initiated by the portion of the element abutting the bridge of the clip which can be exposed in such a manner that the bridge, especially the normal of the bridge, is facing the opening of the housing. In a specific embodiment, the normal of the bridge encloses with the direction of movement of the portion of the element an angle between 0° and 45°, alternatively between 0° and 30°, alternatively between 0° and 10°. In a specific embodiment, the normal of the bridge is substantially parallel to the direction of movement of the portion of the element.

It is described that the second leg is connected to a second part of the housing. The connection of the second leg with the second part of the housing can be provided by several alternatives. A first alternative can be that the connection is provided by a holding protrusion of the second leg being arranged behind a holding ledge of the second part of the housing. In a second alternative, the connection of the second leg with the second part of the housing can be provided by a breakable connection that can be broken by applying a shearing force to it. The connection of the second leg with the second part of the housing can be formed by any non-releasable connection, i.e. a substance-locking connection, in which the second leg and the second part of the housing are held together by atomic and molecular forces. The breakable connection can be formed by glueing, solding, welding and/or vulcanizing. Especially, the shearing force can be applied by a force directed in a direction of the movement of the portion of the element being inserted. A third alternative can be a combination of the aforementioned alternatives.

The first part of the housing can be a part of the housing which is formed in one piece with the housing body. The first part of the housing can be arranged at the region of the opening. Especially, the first part of the housing may form a side of the opening.

The second part of the housing can be a part of the housing which is formed in one piece with the housing body, especially together with the first part of the housing. The second part of the housing can be arranged at the region of the opening. Especially, the second part of the housing may form a side of the opening, especially opposite to the first part of the housing. The housing can be symmetrically adapted with regard to the first and second part. A rotation invariance can be provided with regard to the assembly.

The holding ledge of the first and/or second part of the housing can comprise an abutment or abutment portions for the holding protrusion(s) of the first leg and second leg, respectively. The abutment or abutment portions may have at least a section of a surface which has/have a normal including an angle with the moving direction of the element which is to be clamped into the receiving space between 10° and 170°. The holding ledge of the first part of the housing may comprise a protrusion which extends with an angle not being 0° relative to the direction perpendicular to the movement of the element which is to be clamped. The section of the surface of the abutment or the protrusion may extend with an angle of 45° to 135°, alternatively 60° to 120°, alternatively 70° to 110°, alternatively 80° to 100°, with regard to the direction perpendicular to the movement of the element which is to be clamped. The holding ledge of the first and second part of the housing can be symmetrically to each other with regard to the opening. With this regard an efficient and secure positioning of the two legs in a tensioned state of the clip can be provided, which in addition or as an alternative can be released without applying a high force via the portion of the element.

Especially, the holding protrusion of the first and/or second leg can be arranged at the end or in the region of the end of the first and second leg, respectively. Typically, the holding protrusion of the first and/or second leg can be a section of the respective leg which is displaced with regard to a longitudinal axis of the leg defined by the leg body. In certain embodiments, the leg body comprises a section extending from the bridge, the section being substantially straight after a curved portion which may be arranged between the bridge and the substantially straight section. The holding protrusion can be formed by bends or curved portions at an end of the leg, for example by bending the end of the leg twice or more, especially the bending is performed in two different directions, however, bending in the same direction is also possible. The first bending can be away from the center of the bridge (outward bending) and the second bending can be towards the center of the bridge (inward bending). Typically, each of the bends can be a bending between 10° to 170°, alternatively 30° to 150°, alternatively 50° to 130°. In a specific embodiment the bending can be a bending between 80° and 100°, and in an even more specific embodiment, the bending is a bending to substantially 90°. The amount of bending can differ for each of the bends or be the same for at least two of the bends. The holding protrusion of the first and/or second leg can be substantially parallel displaced relative to the respective leg body. The holding protrusion of the first and/or second leg can be unitarily formed with the respective leg. The displacement of the holding protrusion offers the possibility for accessing leg bodies without interfering with the holding protrusion even in case that the holding protrusion is arranged at the end of the leg. More than one holding protrusion per leg is possible. The number of holding protrusions per leg can be 1, 2, 3, 4, 5, 6 or even more, wherein one or two holding protrusions per leg are typical. In certain embodiments, the holding protrusions of the two legs can be arranged mirror-like on the two legs with regard to the bridge, especially with regard to the longitudinal axis of the bridge. A simple manner of production can be obtained. Further, a rotation invariance can cause a simple assembly of the clamping element.

In a specific embodiment, the connection of the second leg with the second part of the housing is provided by the holding protrusion of the second leg being arranged behind the holding ledge of the second part of the housing, the contact between the holding protrusion of the second leg and the holding ledge being lost, if the second leg is moved in a sliding manner within the housing. Thus, the first leg as well as the second leg can be disengaged and/or broken from the respective part of the housing and move towards each other initiated by the sliding motion. A symmetrical arrangement can be obtained.

In a specific embodiment, a part of the opening is provided at a front side of the housing whereby the opening continues in a first direction from the front side onto a first side of the housing that is angled relative to the front side and whereby the opening continues in a second direction that opposes the first direction onto a second side of the housing that is angled relative to the front side, the second side of the housing being opposite the first side of the housing. In the specific embodiment, the housing can have any shape as long as it provides an opening which can be accessed from three sides which is from the front side comprising the opening and two sides which are transverse (not necessarily perpendicular at 90°) to the front side, and the two transverse sides to the front side being opposite to each other. The housing can be formed in a "U-shaped", "horse-shoe-shaped" or "clamp-shaped" manner. The two sides transverse to the two sides into which the opening continues from the front side can comprise the first part and the second part of the housing. The opening at the front side can be a slit-like opening seen in the direction of the receiving space. The opening can provide access into the receiving space from three sides to obtain the possibility that the element which is to be clamped can extend in these directions and/or simple positioning of the clip into the receiving space. Further, less material is provided, reducing costs and weight.

In a specific embodiment, the housing can have at least one expanding section, typically more than one expanding sections positioned at the region of the opening, the expanding section being generally exposed to the front side of the housing. One or more expanding sections per side—for example opposing sides—can be provided. The expanding section can facilitate the positioning of the clip in the receiving space for establishing the pre-assembly state. When introducing the clip in the housing through the opening, the legs can be brought into contact with the expanding section. The legs can engage with the expanding section and slide on the expanding sections which enclose an angle with regard to the direction of movement into the receiving space of 10° to 80°, alternatively 30° to 60°, alternatively 40° to 50°. When at least one of the legs slides on the expanding section when the clip is pushed further through the opening, the distance between the first leg and the second leg increases. In the direction of movement, the holding ledge follows the expanding section of the housing. The expansion of the clip when introduced into the receiving space obtains a tensioned state of the clip. A simple manner for assembling as well as simple components used for the assembling of the clamping element in its pre-assembly state can be obtained.

In a specific embodiment, the clip has a first holding arm and a second holding arm arranged opposite the first holding arm and spaced apart from the first holding arm, whereby starting from an at-ease position of the first holding arm and the second holding arm, the first holding arm and the second holding arm can be moved closer together upon application of a force. A frictional engagement of the first holding arm and the second holding arm with the walls surrounding the receiving space can be obtained in case the receiving space is smaller than the distance between the at-ease position of the first holding arm and the second holding arm. Providing holding arms additional to the two legs results in the possibility to allow for a positioning of the clip independently of the legs and their respective position. An additional measure for positioning of the clip in the housing can be obtained. The first and/or the second holding arm can extend from the bridge. Typically, the first holding arm and/or the second holding arm are formed from one piece together with the bridge, especially with the bridge and the legs, which allows for simple assembling. In certain embodiments the first holding arm and/or the second holding arm are arranged at the same side and connected to the same side as the first leg and the second leg, respectively. Generally, the two legs and the two holding arms extend substantially in the same direction away from the bridge.

The first and/or the second holding arm can have one or more, especially two, connecting sections with the bridge which—in case of two or more connection sections—can be separate to each other. The first and/or second holding arm may include a window. A window may obtain the possibility to provide a stable connection by reducing the material and/or weight. The window provides in addition or alternatively the possibility that the respective leg can be attached or connected to the bridge between the two connecting sections of the respective holding arm. The holding arm can have a bigger extension than the leg which can be used for stabilizing the clip, especially in the receiving space of the housing in the pre-assembly state and/or in the assembly state. The window of the holding arm may be surrounded by a section of the bridge, which is connected to the leg, the portions extending from the connecting sections of holding arm and the bridge and a section of the holding arm being spaced apart from the bridge and connecting the two sections of the holding arm extending from the bridge. Further, the window provides in addition or alternatively the possibility that a guiding element of the housing can engage with an edge of the window to support the movement of the clip in the housing. A clamping element can be obtained which has reduced space and features that have at least a double function.

When it is described that the leg can form a window with the bridge, this also offers the possibility that the respective holding arm can be arranged at least partly in the window of the leg and/or the holding arm is connected to the bridge in the window formed by the leg and the bridge, wherein the space for the elements can be reduced and/or the securing and stabilizing features act symmetrically.

Especially, each of the holding arms can have a curved end being spaced apart from the bridge, the curved end provides the possibility to support the clip in the receiving space of the housing in a frictional connection without sharp ends scratching in one of the walls of the housing surrounding the receiving space. The interaction of the holding arm(s) and the side walls of the receiving space can reduce squeak and/or rattle.

In a specific embodiment, the first holding arm and/or the second holding arm has a protrusion that in the assembled state of a clamping element, which describes the position that the elements of the clip have, if they are to accommodate the element that is to be clamped having been introduced into the receiving space, engages a ledge of the housing such that the clip is prevented from being pulled out of the housing in the assembled state. The first and/or second holding arm of the clip can be used to establish a form-fitting with the housing and thus properly secure the clip in the housing, especially when the two legs engage the portion of the element. Typically, the protrusion can be arranged in the same region as the region of the legs with regard to the longitudinal extension of the bridge which is perpendicular to the direction between the two legs. The protrusion can interact with the ledge of the housing at substantially the same region as the leg can interact with the portion of the element with regard to the longitudinal extension of the bridge. In certain embodiments, the protrusion is arranged above a window formed by the holding arm and the bridge, in which window the leg is positioned, wherein stabilizing and securing features interact symmetrically consuming reduced space.

In a specific embodiment, the bridge has a bridge protrusion that in the assembled state of a clamping element, which describes the position that the elements of the clip have, if they are to accommodate the element that is to be clamped having been introduced into the receiving space, engages a ledge of the housing such that the clip is prevented from being pulled out of the housing in the assembled state. Typically, the bridge comprises two bridge protrusions on opposite sides of the bridge. For example, the bridge protrusions can be positioned in the window of the leg. Especially, the bridge protrusions can be arranged mirror-like on the bridge, e.g. in the middle of the bridge in the longitudinal direction of the bridge. The bridge protrusion(s) can be used to establish a form-fitting with the housing and thus properly secure the clip in the housing, especially when the two legs engage the portion of the element. In certain embodiments, the bridge protrusion can be arranged in the same region as the region of a leg with regard to the longitudinal extension of the bridge which is perpendicular to the direction between the two legs. The bridge protrusion can interact with the ledge of the housing at substantially the same region as the leg can interact with the portion of the element with regard to the longitudinal extension of the bridge.

The possibility with regard to the form-fitting of the protrusion of a holding arm with a ledge of the housing can be alternatively or additionally provided to the possibility of a form-fitting of the bridge protrusion with a ledge of the housing.

In a specific embodiment, the legs can also be adapted to engage a side wall of the receiving space of the housing when the clamping element is in the assembled state, i.e. clamped to the element. For example, the section of the leg which engages the side wall of the receiving space can be arranged at the end of the leg spaced apart from the bridge. Especially, the first leg and the second leg engage opposing side walls of the receiving space. The engagement of at least one leg with a side wall provides the possibility to reduce squeak and/or rattle.

In a specific embodiment, a spring element is arranged between the housing and the clip, the spring element being tensioned, if the clip is pushed further into the housing and further away from the opening. The arrangement of the spring element between the housing and the clip can be provided by several alternatives. The spring element can be attached to the housing or attached to the clip. Further, it is possible, that the spring element is a separate element not being physically attached to the housing or the clip. The function of the spring element is to provide a force against which a counterforce has to be applied to release or break the connection of at least the first leg with the first part of the housing to transfer the clamping element from the pre-assembly state to the assembly state in which the portion of the element is clamped by the clamping element. The spring element can be any elastic component that stores mechanical energy. In certain embodiments the spring element is arranged between the bridge and the housing. More than one spring element can be provided, especially the clamping element can have two spring elements, especially arranged symmetrically with regard to an axis perpendicular to the longitudinal axis of the bridge.

In a specific embodiment, the housing comprises a guide rail for interacting with a slide element of the clip, the guide rail supporting the slide element during the movement of the clip, if the clip is pushed into the housing and further away from the opening. A simple manner to assemble the clip in the receiving space of the housing can be obtained. One or more guide rails can be provided on the one or two side walls of the housing in the receiving space to improve support during movement of the clip. It is possible that the clip comprises more than one slide element, especially two, three or four slide elements can be provided. In specific embodiments, the slide elements can be formed at the end of the sides of the holding arms, especially transverse to the bridge. A guiding of the clip is possible without interfering with the small room in the receiving space. Especially, the guide rail(s) of the housing can be made in one piece with the housing. Further, the slide element(s) of the clip can be made in one piece with the clip.

In certain embodiments, a barb is arranged on the first leg of the clip and/or a barb is arranged on the second leg of the clip. The term "barb" encompasses a backward-facing section on a leg, rendering extraction or separation from the clamping element more difficult. Especially, the backward facing section is arranged such that the end of the barb spaced apart from the connection with the leg faces away from the receiving space into the middle of the receiving space allowing to get in contact with the portion of the element.

More than one barb per leg can be provided, especially two barbs can be arranged on the first leg of the clip and/or two barbs can be arranged on the second leg of the clip.

In a specific embodiment, the clip is made of metal and/or the housing is made of a non-metallic material. Typically, the clip is made of a spring steel, however, further metals are possible. In these or other embodiments, the housing is made of a plastic reducing the weight of the clamping element, however, further materials for the housing are possible.

In a specific embodiment the housing and the elements and/or components which the housing can have or comprise can be made of a single piece obtaining simple manufacture and an easy to handle component. Especially, the housing can have a mirror-like symmetry, for example with regard to a plane extending perpendicular to a connection between the first part of the housing and the second part of the housing, wherein the plane intersects the connection between the first part of the housing and the second part of the housing in the middle. The design of the housing can have a rotation invariance with regard to an axis extending through the center of the opening into the receiving space by 180° so that a simple assembly as well as a easy clamping procedure is possible.

In a specific embodiment the clip and the elements and/or components which the clip can have or comprise can be made of a single piece obtaining simple manufacture and easy to handle component. Especially, the clip can have a mirror-like symmetry, for example with regard to a plane extending perpendicular the bridge, wherein the plane intersects the bridge in the middle between the first and the second leg.

The invention further provides a method for assembling a clamping element, which is described in the description. The method comprises the steps of introducing the clip into the housing through the opening, spreading the first leg and the second leg of the clip apart and at least one of the following steps: (a) pulling the clip backwards towards the opening until the holding protrusion of the first leg is arranged behind the holding ledge of the first part of the housing and (b) pushing the clip further away from the opening until the holding protrusion of the first leg is arranged behind the holding ledge of the first part of the housing. The two last-mentioned steps relate to the possibility that the end of the legs spaced apart from the bridge can extend in a direction substantially facing the opening or can extend in a direction opposite to the opening.

In a specific embodiment with regard to especially one of the embodiments of the clamping element described, the method for assembling the clamping element can comprise a positioning of the clip on an assembly slider.

In a specific embodiment, the assembly slider comprises a holding portion for the clip and an expander, wherein the expander can be relatively moved with regard to the holding portion. Further, the holding portion as well as the expander can be moved together.

The holding portion of the assembly slider can be adapted to form a form fit with the clip.

With this regard the clip can comprise at least one hole, especially more than one hole, for example two holes, to form a form fit with respective pins of the holding portion. A defined positioning of the clip on the holding portion can be obtained. Further, in addition or alternatively, the holding portion can comprise a means for securing the clip on the holding portion. The means can be a magnet, for example at least one neodymium magnet, in case the clip comprises a metal. A permanent magnet provides the possibility of a simple and non-costly assembly method, however, an electromagnet is also possible.

The assembly slider is adapted to push the clip into the housing through the opening. Thus, the size of the assembly slider can be adapted to the size of the opening. The clip can be positioned on the holding portion of the assembly slider and the holding portion and the expander move into the receiving space. During the movement the holding arms of the clip can be displaced when passing the opening. After passing the opening the holding arms of the clip can snap back and provide a friction fit between the clip and the housing. The movement of the assembly slider can be stopped by abutting assembly stoppers inserted in the receiving space of the housing. A defined positioning of the clip in the receiving space is possible.

In a specific embodiment, the holding portion can engage with the pins in cavities of the assembly stoppers so that not only a defined position with regard to depth in the receiving space is obtained but also a defined positioning in the lateral dimensions.

In a specific embodiment, after the holding portion has reached its final positon in the downward movement, the expander moves relative to the holding portion into the receiving space. The expander applies a force to the first leg and the second leg, expanding the two legs.

In a specific embodiment, the expander reaches a final position and is kept in place. Then, the assembly slider can be moved upward without a relative movement of the expander and the holding portion. As a result, the clip is pulled back in the housing and the clip moves in its pre-assembly position with the holding protrusion of the first leg behind the holding ledge of the first part of the housing and the holding protrusion of the second leg behind the holding ledge of the second part of the housing. The two legs are pre-tensioned and the holdings arms engage properly in the housing.

In a specific embodiment the assembly slider comprises a holding portion for the clip so that the holding portion forms a form fit with legs of the clip in the direction of movement of the clip into the receiving space of the housing. The housing can provide expanding sections. During movement of the clip into the receiving space the legs can come into contact with the expanding sections and a force is applied to the first leg and the second leg to move the legs further apart. The two legs can slide on the expanding sections which enclose an angle with regard to the direction of movement into the receiving space of 10° to 80°, alternatively 30° to 60°, alternatively 40° to 50° and the distance between the two legs increases. In the direction of movement, the holding ledge follows the expanding section of the housing. The expansion of the clip when having been introduced into the receiving space aims two aspects. One is that the clip is in the tensioned state after passing the expanding section. The second one is that the assembly slider is disengaged from the clip and can be moved upwards while keeping the clip in its position in the receiving space. A simple manner for assembling of the clamping element in its pre-assembly state can be obtained.

Further, the invention provides a method for clamping a clamping element to a portion of an element. The method comprises the steps of providing the clamping element in the pre-assembly state and introducing the portion of the element through the opening into the receiving space until the portion contacts the clip and pushes the clip deeper into the housing and further away from the opening, thereby disconnecting the first leg of the clip from the first part of the housing and allowing the first leg to move into the second position of the first leg that is closer towards the second leg than the first position.

In a specific embodiment, during the method for clamping the clamping element to the portion of the element comprises in the step in which the portion is inserted in the opening and further into the receiving space that an end of the portion abuts the bridge of the clip of the clamping element. When pushed further into the receiving space, the contact between the first leg and the holding ledge as well as the contact between the second leg and the holding ledge can be lost. The first leg and the second leg can be released and move towards each other into the second position in which the first leg is closer towards the second leg than in the first position.

Further, the invention provides a system of an element and a clamping element according to the description and the claims. A portion of the element is arranged in the receiving space. The first leg rests against a first side of the portion of the element. The second leg rests against a second side of the portion of the element.

The explanations with regard to the clamping element, especially explanations with regard to similar terms used, hold for the methods as well as for the system.

With reference to the drawings, FIG. 1 shows a clamping element 1 suitable to clamp to a portion 100 of an element 101 (not shown in FIG. 1). The clamping element 1 comprises a housing 2 and a clip 3. The housing 2 has a receiving space 4 and an opening 5 that connects the outside of the housing 2 with the receiving space 4.

The clip 3 is arranged inside the housing 2. The clip 3 comprises a first leg 6 and a second leg 7 arranged opposite each other. A bridge 8 connects the first leg 6 and the second leg 7. The receiving space 4 is at least partially arranged between the first leg 6 and the second leg 7 to accommodate the portion 100 of the element 101 to be clamped (see FIG. 8).

The clip 3 is adapted in such a way that a force needs to be applied to move the first leg 6 away from the second leg 7 and the clip 3 can be brought into a tensioned state. With regard to this, FIGS. 4 to 8 show a state of the clip 3 in which no force is applied to the first leg 6 and the second leg 7 to move these away from each other.

FIG. 1 shows the clamping element 1 in a pre-assembly state of the clip 3, which describes the position that the elements of the clip 3 have prior to the portion 100 of the element 101 has been introduced into the receiving space 4. The first leg 6 with regard to its relative position relative to the second leg 7 is held in a first position by being connected to a first part 9 of the housing 2, the connection of the first leg 6 with the first part 9 of the housing 2 being provided by two holding protrusions 11 of the first leg 6 being arranged behind a holding ledge 13 of the first part 9 of the housing 2, the contact between the holding protrusions 11 of the first leg 6 and the holding ledge 13 being lost, if the first leg 6 is moved in a sliding manner indicated by the arrow in FIG. 1 within the housing 2.

Further, the second leg 7 is connected to a second part 10 of the housing 2, the connection of the second leg 7 with the second part 10 of the housing 2 being provided by two holding protrusions 12 of the second leg 7 being arranged behind a holding ledge 14 of the second part 10 of the housing 2.

Figure 2:
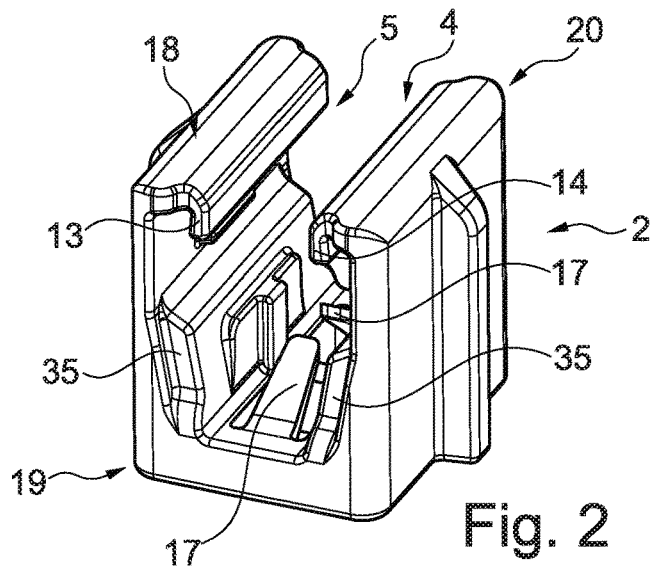
FIG. 2 shows a housing of the clamping clip according to FIG. 1 in a perspective view.
Figure 3:
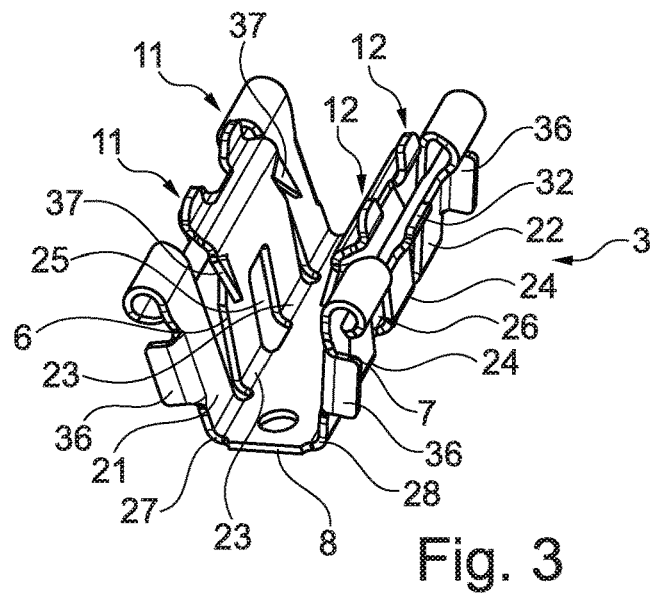
FIG. 3 shows a clip of the clamping element according to FIG. 1 in a perspective view.
Figure 4:
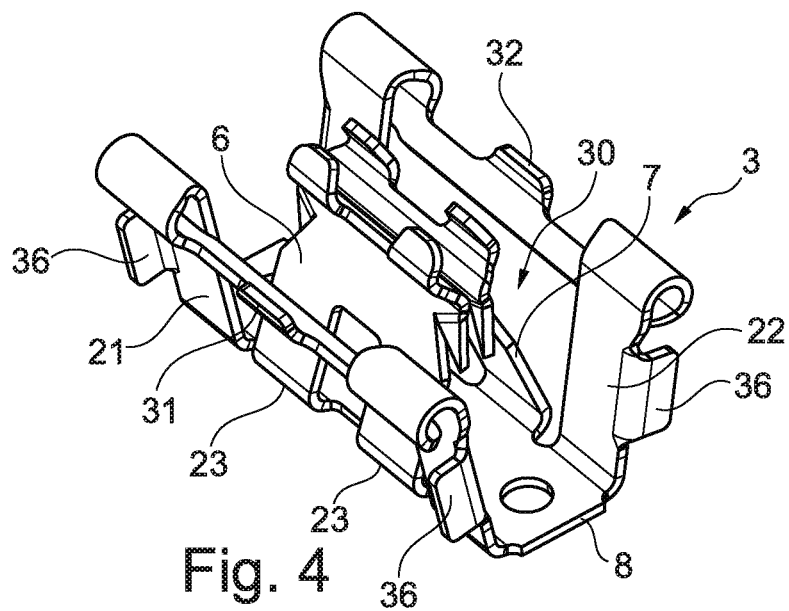
FIG. 4 shows the clip of FIG. 3 without a force applied between two legs seen from above.
Figure 5:
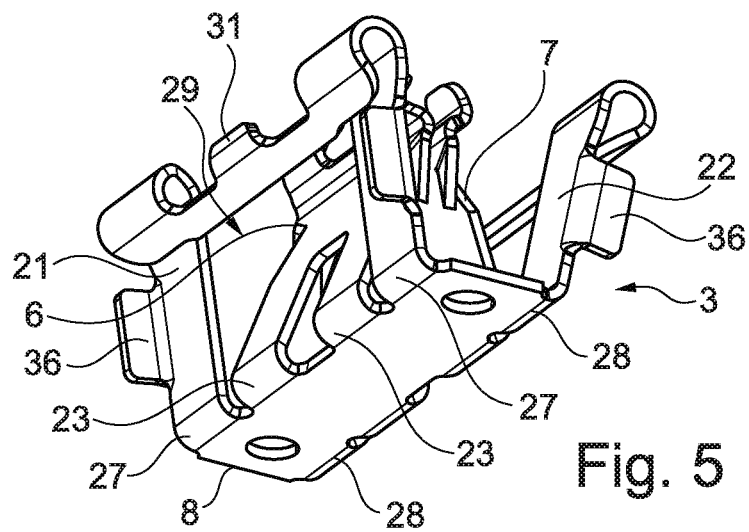
FIG. 5 shows the clip of FIG. 4 seen from below.
Figures 6, 7:
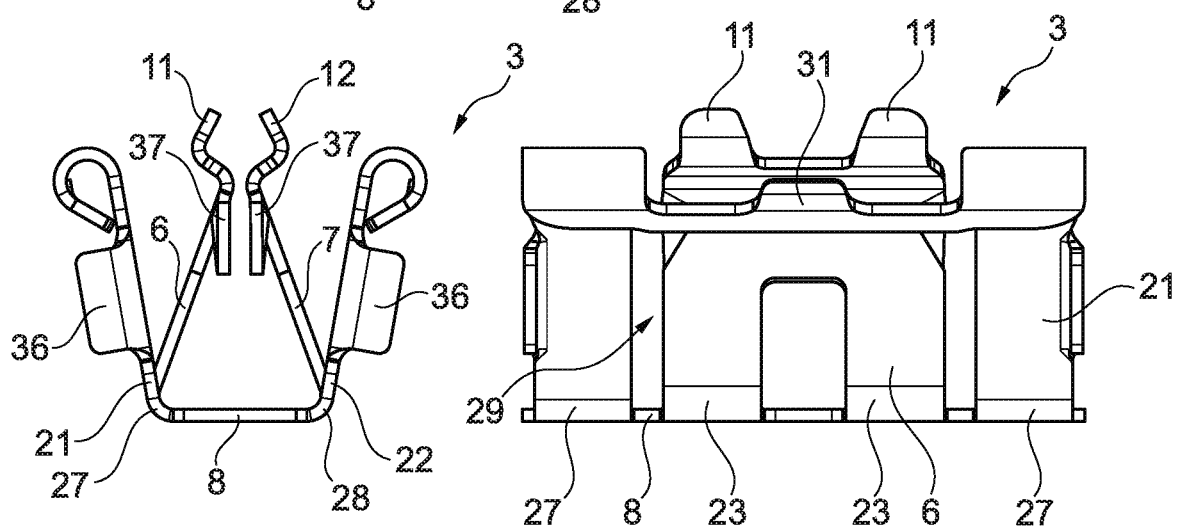
FIG. 6 shows a side view of the clip of FIG. 4.
FIG. 7 shows a further side view of the clip of FIG. 4.

In the state of the clip 3 shown in FIGS. 1 to 3 the first leg 6 is in a first position and spaced apart from the second leg 7 to such an extent that the clip 2 is in a tensioned state. The tensioned state creates a restoring force onto the first leg 6 that is directed to move the first leg 6 towards a second position of the first leg 6 that is closer towards the second leg 7 than the first position. This position is shown in FIGS. 4 to 8.

As can be especially seen from FIG. 3, the first leg 6 and the second leg 7 have two connecting sections 23, 24 with the bridge 8 which are separate to each other, respectively. A window 25, 26 is formed. The windows 25, 26 are surrounded by a part of the bridge 8, the sections of the leg 6, 7 extending from the connecting sections 23, 24 and a section of the leg 6, 7 being spaced apart from the bridge 8 and connecting the two sections of the leg 6, 7 extending from the bridge 8.

Each of first leg 6 and the second leg 7 of the clip 3 comprises a straight portion connected to the bridge 8. Spaced apart from the bridge 8 each of the first leg 6 and the second leg 7 comprises the holding protrusions 11, 12, respectively. The holding protrusions 11, 12 are positioned at the end of the legs 6, 7 spaced apart from the bridge 8. The holding protrusions 11, 12 are connected to the straight portion by two bended portions. The holdings protrusions 11, 12 are substantially facing away from the bridge 8. The holdings protrusions 11, 12 are arranged parallel to the straight portion of the legs 6, 7.

The housing 2 is U-shaped having the holdings ledges 13, 14 extending into the receiving space 4 at two sides of the opening 5. The housing 2 is rigid having two sides 15, 16.

Two spring elements 17 are arranged between the housing 2 and the clip 3, the springs element 17 are tensioned, if the clip 3 is pushed further into the housing 2 (along the arrow shown in FIG. 1) and further away from the opening 5.

To allow access to the spring elements 17 during positioning of the clip 3 in the receiving space 4 of the housing 2 the opening 5 continues in from the front side 18 onto two sides 19, 20 of the housing 2 transverse to the front side 18 and opposite to each other.

The clip 3 further comprises a first holding arm 21 and a second holding arm 22 arranged opposite the first holding arm 21 and spaced apart from the first holding arm 21. The first holding arm 21 and the second holdings arm 22 can be moved closer together than shown in FIGS. 4 to 7 (an at-ease position of the first holding arm 21 and the second holding arm 22) upon application of a force. Such an application of a force can be applied by positioning the clip 3 in the receiving space 4 (shown in FIGS. 1 and 3). The clip 3 is held in frictional force in the receiving space 4. The first holding arm 21 and the second holding arm 22 are arranged at the same side and connected to the same side as the first leg 6 and the second leg 7, respectively.

The first and the second holding arm 21, 22 have two connecting sections 27, 28 with the bridge 8 which are separate to each other. The first and the second holding arm 21, 22 include a window 29, 30. Each of the legs 6, 7 is connected to the bridge 8 between the two connecting sections 27, 28 of the respective holding arm 21, 22.

The holdings arms 21, 22 have a curved end being spaced apart from the bridge 8, the curved end in frictional engagement with the housing 2 in the receiving space 4.

Figure 8:
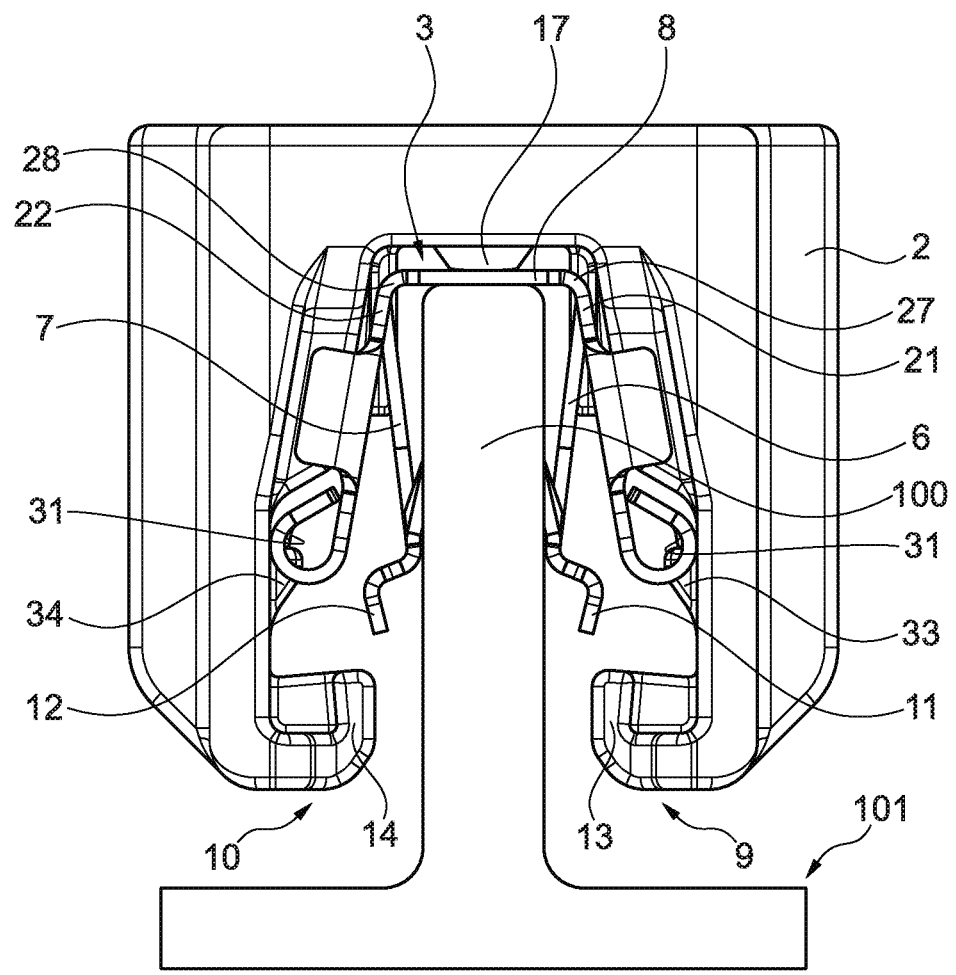
FIG. 8 shows a clamping element in an assembly state of the clip in a side view.

Further, the first holding arm 21 and the second holding arm 22 each have one protrusion 31, 32. The protrusions 31, 32 are in the pre-assembly state of the clamping element 1 which is shown in FIG. 8, which describes the position that the elements of the clip 3 have, if they are to accommodate the element 101 that is to be clamped having been introduced into the receiving space 5, engages a ledge 33, 34 of the housing 2 such that the clip 3 is prevented from being pulled-out of the housing in the assembled state. A form fit is established to secure the clip 3 in the housing 2.

Further, the housing 2 comprises four guide rails 35 for interacting with four slide elements 36 of the clip 3. The four guide rails 35 support the slide elements 36 during the movement of the clip 3, when the clip 3 is pushed into the housing 2 and further away from the opening 5. The four guide rails 35 are provided on the two side walls of the sides 15, 16 of the housing 2 in the receiving space 4. The slide elements 36 are formed at the end of the sides of the holding arms 21, 22 transverse to the bridge 8.

Each of the legs 6, 7 of the clip 3 comprises two barbs 37 for secure fastening of the portion 100 of element 101 which is clamped.

The bridge 8 of the clip 3 shown with regard to the embodiment described in FIGS. 1 to 8, comprises two holes 38 which will be used during positioning of the clip 3 in the receiving space 4 to establish the pre-assembly state of the clamping element 1 shown in FIG. 1.

Figure 9A:
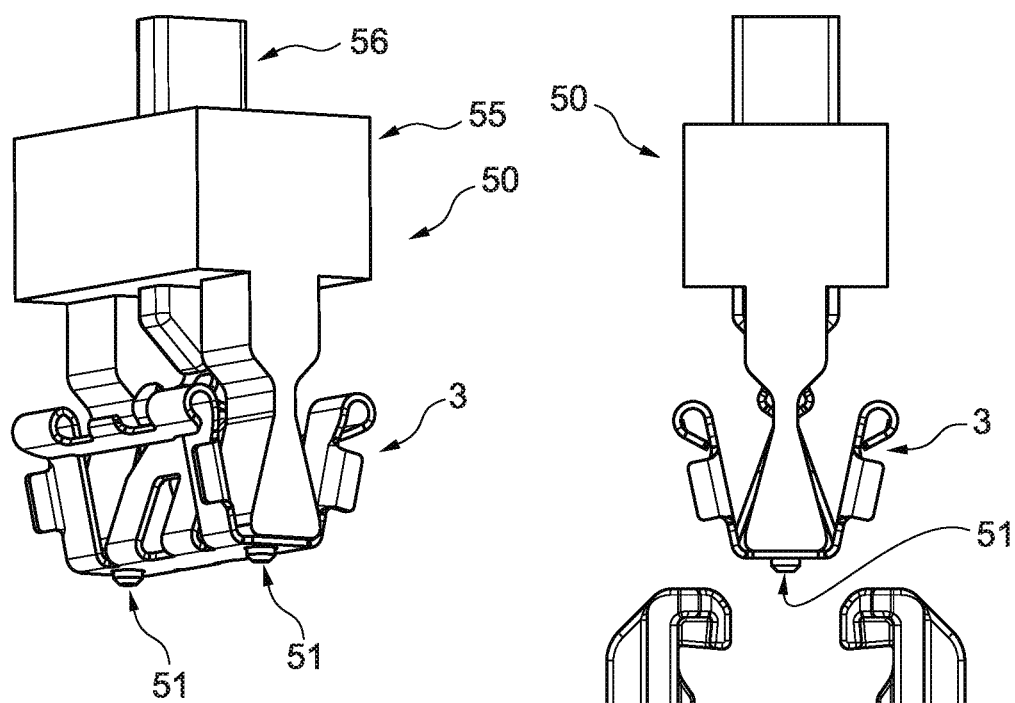
FIGS. 9a-9c show devices used for assembling the clamping element according to FIG. 1.
Figure 9B:
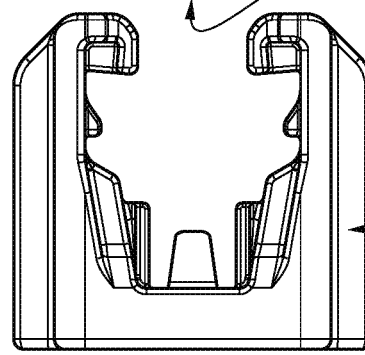
Figure 9C:
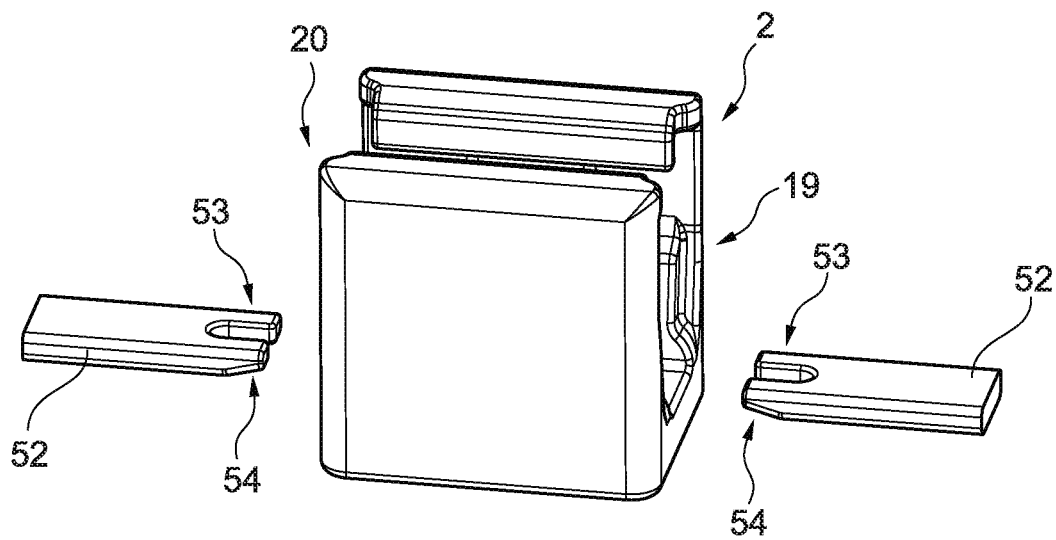

FIG. 9a-9c show devices for assembling the clamping element 1 according to FIGS. 1 to 8. An assembly slider 50 to which the clip 3 is engaged is shown in FIGS. 9a and 9b. The assembly slider 50 comprises a holding portion 55 and an expander 56. The clip 3 is positioned by two pins 51 on the holding portion 55 of the assembly slider 50 which extend through the holes 38 in the bridge 8 of clip 3. The clip 3 is kept in position via two neodymium magnets with regard to the assembly slider 50.

FIG. 9b shows that the assembly slider 50 together with the clip 3 is adapted to pass through the opening 5 into the receiving space 4. Two assembly stoppers 52 are used to define a final position of the assembly slider 50 in the receiving space 4. The assembly stoppers 52 are inserted into the housing 2 from sides 19 and 20 of the housing 2. The assembly stoppers 52 each having a cavity 53 at the respective end 54 which is inserted to the housing 2. The position of the cavities 53 correspond to the position of the pins 51 which can engage the cavities 53 when sliding into the receiving space 4.

Figure 10:
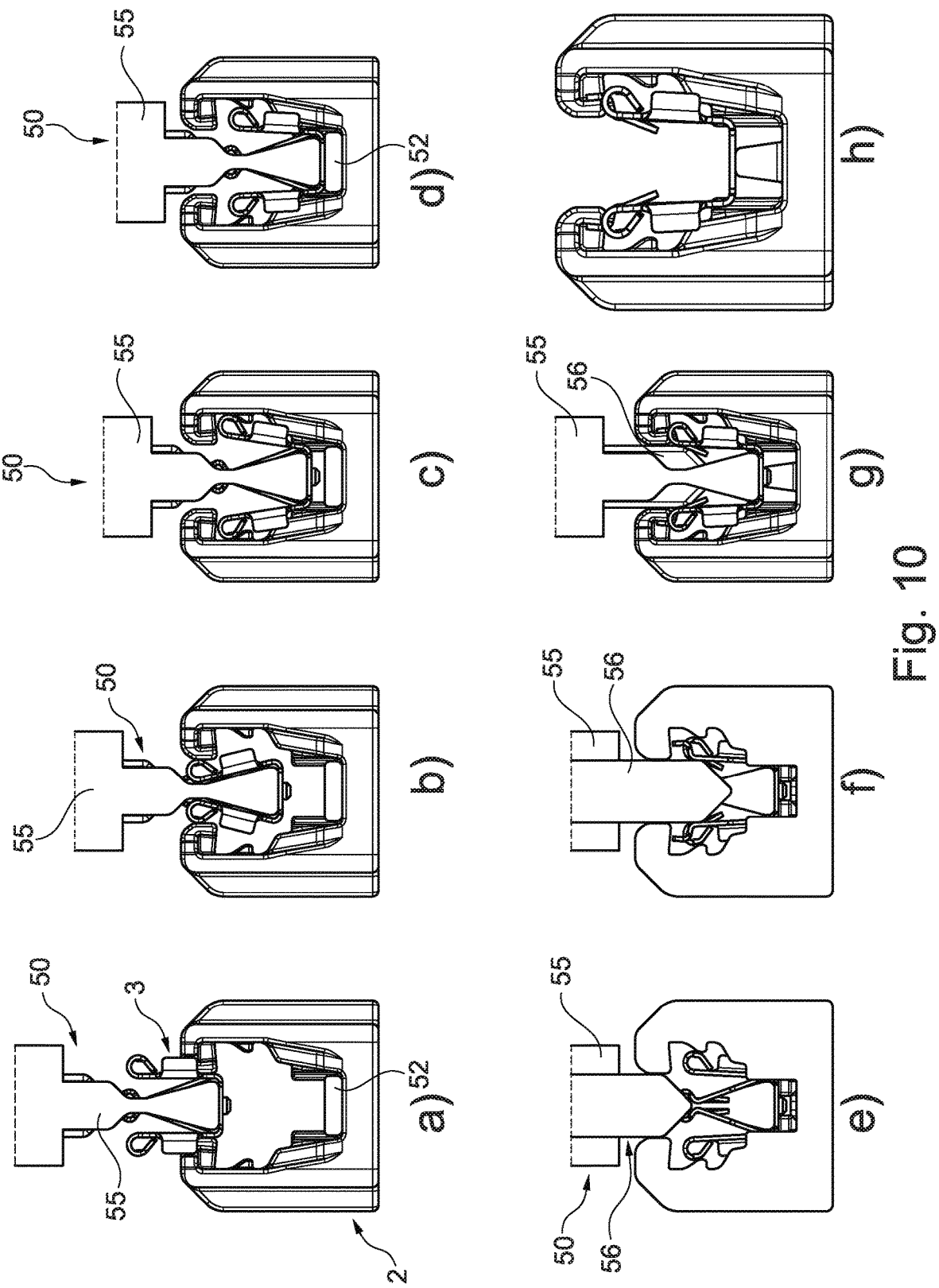
FIG. 10 shows side views of the housing and the clip for a course of movement during the method for assembling the clamping element according to FIG. 1.

A course of movement which describes the method for assembling the clamping element 1 according to FIGS. 1 to 8 is shown in FIG. 10. FIGS. 10a) and b) show that the assembly slider 50 pushes the clip 3 into the housing 2 through the opening 5. The clip 3 is positioned on the holding portion 55 of the assembly slider 55 which can be moved into the receiving space 4. The holding arms 21, 22 of the clip 3 are displaced during the movement through the opening 5. In FIGS. 10c) to 10h) it is shown that the holding arms 21, 22 of the clip 3 snap back after passing the opening 5 and provide a friction fit between the clip 3 and the housing 2. In FIG. 10d) it is shown that the holding portion 55 reaches its final position in the downward movement. The pins 51 of the assembly slider 50 engage the cavities 53 of the assembly stoppers 52.

Shown in FIGS. 10e) and f) is another cross-section which intersects the first leg 6 and the second leg 7. When the holding portion 55 has reached its final position in the downward movement (abutting the assembly stoppers), an expander 56, which can move relative to the holding portion 55, moves into the receiving space 4. The expander 56 applies a force to the first leg 6 and the second leg 7, expanding the two legs 6, 7. In FIG. 10f) the expander 56 reaches its final position.

Further, shown in FIGS. 10g) and h) the same cross-section is shown as in FIGS. 10a) to 10d) and the assembly slider 50 is moved upward without a relative movement of the expander 56 and the holding portion 55. Therefore, the clip 3 is pulled back in the housing 2 and the clip 3 moves in its final position with the holding protrusion 11 of the first leg 6 behind the holding ledge 13 of the first part 9 of the housing 2 and the holding protrusion 12 of the second leg 7 behind the holding ledge 14 of the second part 10 of the housing 2. The two legs 6, 7 are pre-tensioned and the holdings arms 21, 22 engage properly in the housing 2. The first leg 6 is in the first position with regard to the second leg 7.

Figure 11:
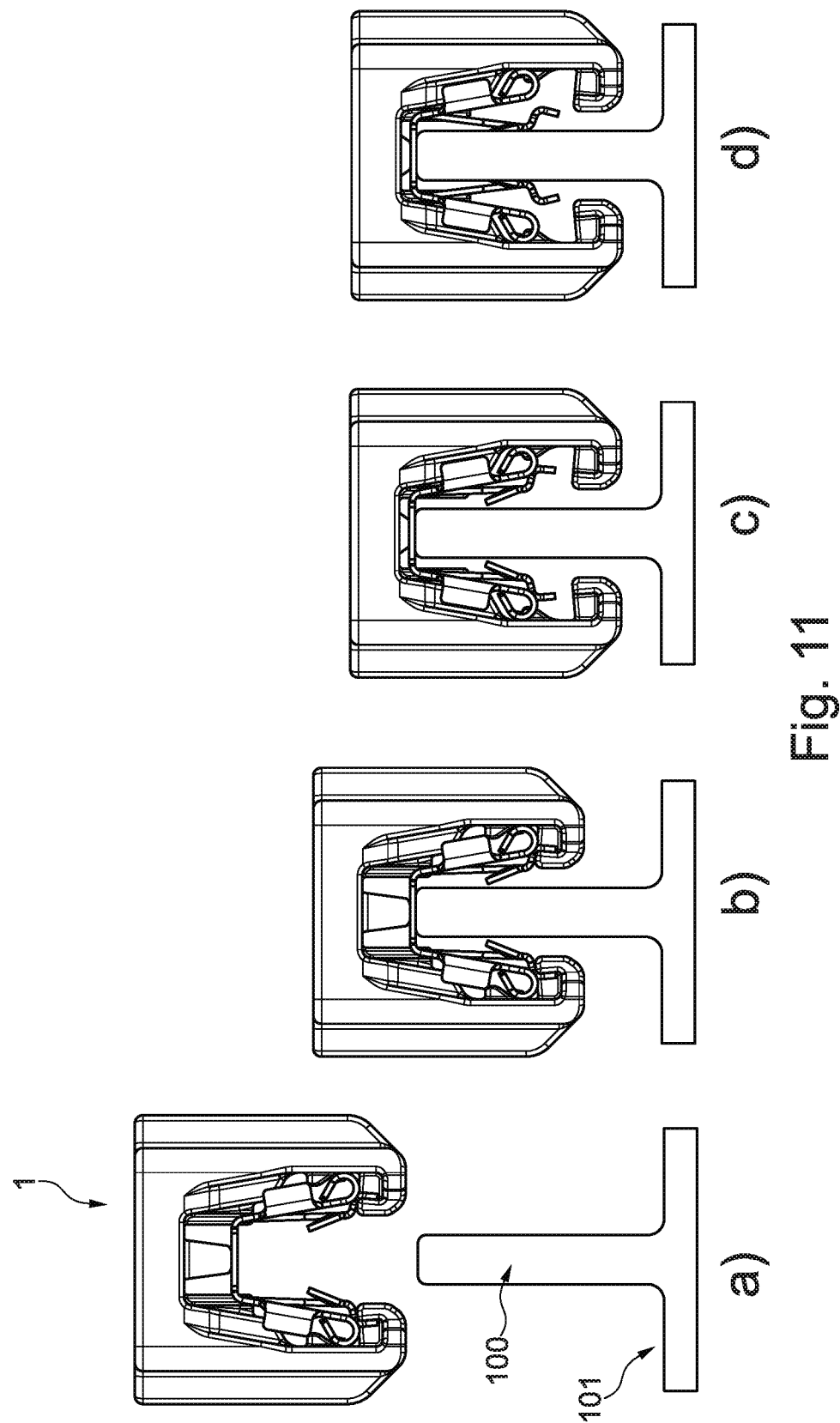
FIG. 11 shows side views of the clamping element according to FIG. 1 for a course of movement during a method for clamping the clamping element.

In FIG. 11 side views of the clamping element 1 according to FIG. 1 for a course of movement during a method for clamping the clamping element 1 to the portion 100 of the element 101 is shown. In FIGS. 11a) and 11b) the portion 100 is inserted in the opening 5 and further into the receiving space 4. In FIG. 11b) the end of the portion 100 abuts the bridge 8 of the clip 3 of the clamping element 1. When pushed further into the receiving space 4 against the force of the springs 17, the contact between the first leg 6 and the holding ledge 11 as well as the contact between the second leg 7 and the holding ledge 12 is lost. The first leg 6 and the second leg 7 are released and move towards each other into a second position, in which the first leg 6 is closer towards the second leg 7 than the first position (FIGS. 11c) and d)). In the position shown in FIG. 11d) the protrusions 31, 32 properly secure in a form fit with ledges 33, 34 of the housing 2.

Figure 12:
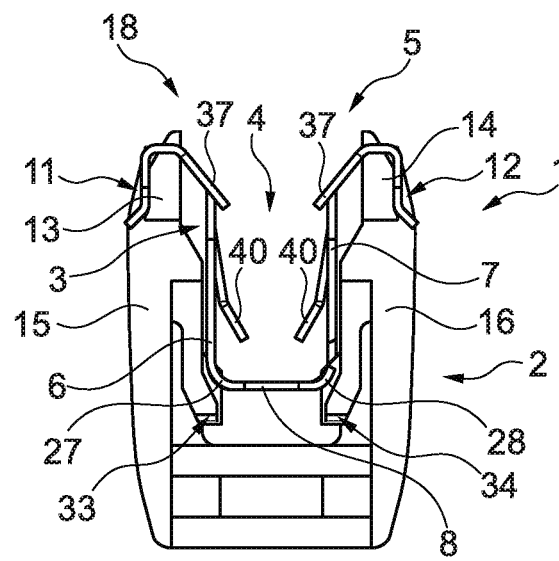
FIG. 12 shows a clamping element in a pre-assembly state of a clip according to a second embodiment in a side view.

FIG. 12 shows in a side view a further embodiment of a clamping element 1. Same reference signs are used in the following for describing the same features or designs of the clamping element described already above with regard to the embodiment shown in FIGS. 1 to 11. With this regard, the embodiment described in connection with FIGS. 12 to 16 corresponds to the embodiment described in connection with FIGS. 1 to 11, and the main differences between the two embodiments will be described below.

Each of first leg 6 and the second leg 7 of the clip 3 according to the embodiment shown with regard to FIGS. 12 to 16, comprises a straight portion connected to the bridge 8 and, spaced apart from the bridge 8, the holding protrusions 11, 12, respectively. The holding protrusions 11, 12 are positioned at the region of the end of the legs 6, 7 spaced apart from the bridge 8. The holding protrusions 11, 12 are connected to the straight portion by three bended or curved portions. The holding protrusions 11, 12 are substantially facing in the direction of the bridge 8. The holding protrusions 11, 12 are bended backwards in the direction of the bridge 8.

The housing 2 comprises in a direction away from the receiving space 4, two expanding sections 39 which are part of the first part 9 and the second part 10 of the housing 2, respectively. The expanding sections 39 interact with the clip 3 during establishing the pre-assembly state which will be described with regard to FIG. 15.

Further, the clip 3 comprises additional barbs 40 being arranged in the window 25, 26 of the legs 6, 7, respectively.

Two bridge protrusions 41 are provided which are connected to the bridge 8. The two bridge protrusions 41 are provided on the two opposing sides on which the first leg 6 and the second leg 7 are provided. The bridge protrusions 41 are positioned in the window 25, 26 of the legs 6, 7, respectively. Correspondingly, the ledges 33, 34 of the housing 2 are positioned in such a way that if the element 101 that is to be clamped has been introduced into the receiving space 4, the ledges 33, 34 engage with one of the bridge protrusions 41 such that the clip 3 is prevented from being pulled out of the housing 2 (cf. FIG. 16c)).

Figure 13:
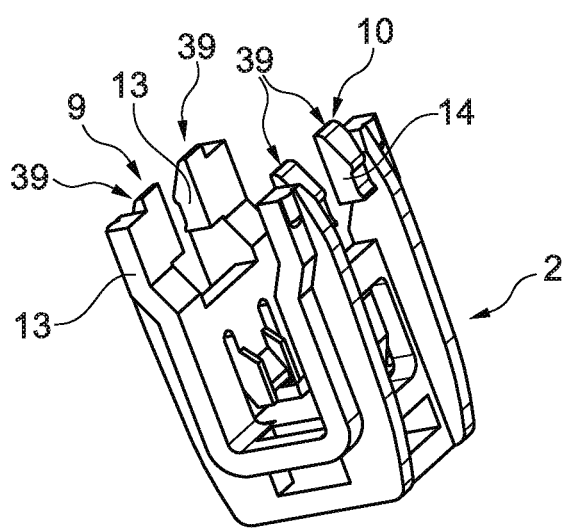
FIG. 13 shows the housing of the clamping element according to FIG. 12 in a perspective view.
Figure 14:
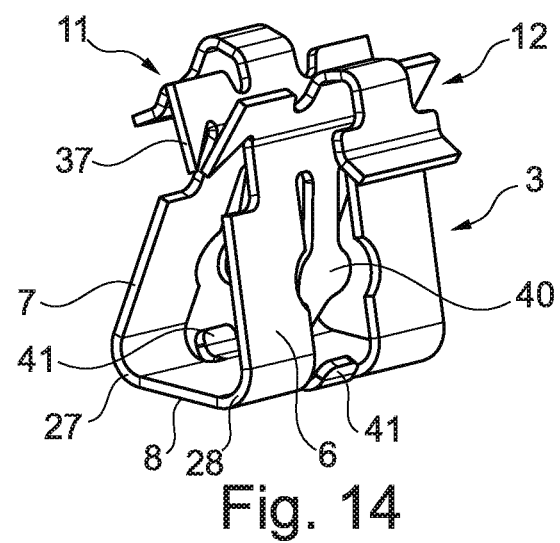
FIG. 14 shows the clip of the clamping element according to FIG. 12 in a perspective view.

A course of movement which describes the method for assembling the clamping element 1 according to FIGS. 12 to 14 is shown in FIG. 15. FIGS. 15a) and b) show that the assembly slider 50 pushes the clip 3 into the housing 2. The clip 3 is pushed through the opening 5 into the receiving space 4. During movement of the clip 3 into the receiving space 4 the legs 6, 7 come into contact with the expanding sections 39 and a force is applied to the first leg 6 and the second leg 7 to move the legs 6, 7 further apart. The two legs 6, 7 slide on the expanding sections 43. In the direction of movement, the holding ledge 13, 14 follow the expanding section 39 of the housing 2.

FIGS. 16a-16c show side views of the clamping element 1 according to the embodiment shown in FIG. 12 for a course of movement during a method for clamping the clamping element 1 to the portion 100 of the element 101 is shown. In FIG. 16a) the portion 100 is inserted in the opening 5 and further into the receiving space 4. In FIG. 16b) the end of the portion 100 abuts the bridge 8 of the clip 3 of the clamping element 1. When pushed further into the receiving space 4, the contact between the first leg 6 and the holding ledge 11 as well as the contact between the second leg 7 and the holding ledge 12 is lost. The first leg 6 and the second leg 7 are released and move towards each other into the second position (FIG. 16c)). Additionally, ends 42 of the first leg 6 and the second leg 7 engage with the sidewall of the sides 15, 16 of the receiving space 4 of the housing 2.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A clamping element suitable to clamp to a portion of an element, the clamping element comprising:

a housing with a receiving space, the housing having an opening that connects the outside of the housing with the receiving space, and a clip arranged inside the housing in both a pre-assembly state and an assembled state, the clip having a first leg and a second leg arranged opposite each other, a bridge connecting the first leg and the second leg, the receiving space at least partially being arranged between the first leg and the second leg, the pre-assembly state of the clip being the position that the elements of the clip have prior to the portion of the element that is to be clamped having been introduced into the receiving space, and the assembled state being the position that the elements of the clip have if they are to accommodate the element that is to be clamped having been introduced into the receiving space, wherein the clamping element is configured such that a force needs to be applied to move the first leg away from the second leg in the pre-assembly state of the clip, wherein the first leg with regard to its relative position relative to the second leg is held in a first position by being connected to a first part of the housing, the connection of the first leg with the first part of the housing being provided by a holding protrusion of the first leg being arranged behind a holding ledge of the first part of the housing, the contact between the holding protrusion of the first leg and the holding ledge of the first part being lost if (i) the first leg is moved in a sliding manner within the housing and/or (ii) the first leg being connected to the first part of the housing by a first breakable connection that can be broken by applying a first shearing force to it, the second leg being connected to a second part of the housing, the connection of the second leg with the second part of the housing being provided by (i) a holding protrusion of the second leg being arranged behind a holding ledge of the second part of the housing and/or (ii) the second leg being connected to the second part of the housing by a second breakable connection that can be broken by applying a second shearing force to it, whereby in the first position of the first leg, the first leg is spaced apart from the second leg to such an extent that the clip is in a tensioned state creating a restoring force onto the first leg that is directed to moving the first leg towards a second position of the first leg that is closer towards the second leg than the first position.

2. The clamping element according to claim 1, wherein in the case that the connection of the second leg with the second part of the housing is provided by the holding protrusion of the second leg being arranged behind the holding ledge of the second part of the housing, the contact between the holding protrusion of the second leg and the holding ledge of the second part being lost if the second leg is moved in a sliding manner within the housing.

3. The clamping element according to claim 1, wherein a part of the opening is provided at a front side of the housing, whereby the opening continues in a first direction from the front side onto a first side of the housing that is angled relative to the front side and whereby the opening continues in a second direction that opposes the first direction onto a second side of the housing, that is angled relative to the front side, the second side of the housing being opposite the first side of the housing.

4. The clamping element according to claim 1, wherein the clip has a first holding arm and a second holding arm arranged opposite the first holding arm and spaced apart from the first holding arm, whereby starting from an at ease position of the first holding arm and the second holding arm, the first holding arm and the second holding arm can be moved closer together upon application of a force.

5. The clamping element according to claim 4, wherein one or both of the first holding arm and the second holding arm has a protrusion that in the assembled state of the clamping element engages a ledge of the housing such that the clip is prevented from being pulled out of the housing in the assembled state.

6. The clamping element according to claim 1, wherein the bridge comprises a bridge protrusion that in the assembled state of the clamping element engages a ledge of the housing such that the clip is prevented from being pulled out of the housing in the assembled state.

7. The clamping element according to claim 1, further comprising a spring element arranged between the housing and the clip, the spring element being tensioned if the clip is pushed further into the housing and further away from the opening.

8. The clamping element according to claim 1, wherein the housing comprises a guide rail for interacting with a slide element of the clip, the guide rail supporting the slide element during the movement of the clip if the clip is pushed into the housing and further away from the opening.

9. The clamping element according to claim 1, further comprising one or both of a barb arranged on the first leg of the clip and a barb arranged on the second leg of the clip.

10. The clamping element according to claim 1, wherein (i) the clip is made of metal; (ii) the housing is made of a non-metallic material; or (iii) both (i) and (ii).

11. A method for assembling a clamping element according to claim 1, comprising the steps of introducing the clip into the housing through the opening, spreading the first leg and the second leg of the clip apart, and at least one of the following steps of (a) pulling the clip backwards towards the opening until the holding protrusion of the first leg is arranged behind the holding ledge of the first part of the housing; or (b) pushing the clip further away from the opening until the holding protrusion of the first leg is arranged behind the holding ledge of the first part of the housing.

12. A method for clamping a clamping element according to claim 1 to a portion of an element, comprising providing the clamping element in the pre-assembly state and introducing the portion of the element through the opening into the receiving space until the portion contacts the clip and pushes the clip deeper into the housing and further away from the opening, thereby disconnecting the first leg of the clip from the first part of the housing and allowing the first leg to move into the second position that is closer towards the second leg than the first position.

13. A system of an element and a clamping element according to claim 1, wherein a portion of the element is arranged in the receiving space, the first leg rests against a first side of the portion of the element, and the second leg rests against a second side of the portion of the element.

* * * * *